(12) United States Patent
Lai

(10) Patent No.: US 7,862,940 B2
(45) Date of Patent: Jan. 4, 2011

(54) MANAGING MEA HYDRATION CYCLING LIFE

(75) Inventor: Yeh-Hung Lai, Webster, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 929 days.

(21) Appl. No.: 11/467,596

(22) Filed: Aug. 28, 2006

(65) Prior Publication Data

US 2008/0050621 A1    Feb. 28, 2008

(51) Int. Cl.
*H01M 8/04* (2006.01)
(52) U.S. Cl. .................. 429/428; 429/433; 429/442; 429/483
(58) Field of Classification Search .............. 429/13
See application file for complete search history.

(56) References Cited

U.S. PATENT DOCUMENTS

2008/0038594 A1\* 2/2008 Lai et al. ............... 429/13

OTHER PUBLICATIONS

Lai et al., Viscoelastic Stress Model and Mecanical Characterization of Perfluorosulfonic Acid (PFSA) Polymer Electrolyte Membranes. In: Proceedings of the 3rd International Conference on Fuel Cell Science Engineering and Technology, May 23-25, 2005, Ypsilaniti, Michicagn, pp. 1-7.\*
Yeh-Hung Lai, Craig S. Gittleman, Cortney K. Mittelsteadt and David A. Dillard, FuelCell2005-74120—Viscoelastic Stress Model and Mechanical Characterization of Perfluorosulfonic Acid (PFSA) Polymer Electrolyte Membranes, The Third International Conference on Fuel Cell Science, Engineering and Technology, May 23-25, 2005, Ypsilanti, Michigan, pp. 1-7.

\* cited by examiner

*Primary Examiner*—Dah-Wei D Yuan
*Assistant Examiner*—Patricia Davis
(74) *Attorney, Agent, or Firm*—Dinsmore & Shohl LLP

(57) ABSTRACT

In accordance with one embodiment of the present invention, a method of operating an electrochemical conversion cell is provided wherein the method comprises the steps of (i) initiating a membrane dehydration sequence when the membrane is characterized by an initial membrane hydration $\lambda_{WET}$ and (ii) maintaining the membrane dehydration sequence until the membrane is characterized by a target membrane hydration $\lambda_{DRY}$. According to the method, the membrane dehydration sequence is characterized by a drying rate that varies in a manner that substantially corresponds to a fatigue life contour map of the membrane. Additional methods and corresponding systems are contemplated.

18 Claims, 3 Drawing Sheets

MANAGING MEA HYDRATION CYCLING LIFE

CROSS-REFERENCE TO RELATED APPLICATIONS

The present application Ser. No. 11/467,596 is related to U.S. patent application Ser. Nos. 11/695,270, filed Apr. 2, 2007; 11/464,226, filed Aug. 14, 2006; and 11/466,832, filed Aug. 24, 2006.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly (MEA) positioned between a pair of flowfields accommodating respective ones of the reactants. More specifically, a cathode flowfield plate and an anode flowfield plate can be positioned on opposite sides of the MEA. The voltage provided by a single cell unit is typically too small for useful application so it is common to arrange a plurality of cells in a conductively coupled "stack" to increase the electrical output of the electrochemical conversion assembly.

The membrane electrode assembly typically comprises a proton exchange membrane separating an anode layer and a cathode layer of the MEA. The MEA is typically characterized by enhanced proton conductivity under wet conditions. For the purpose of describing the context of the present invention, it is noted that the general configuration and operation of fuel cells and fuel cell stacks is beyond the scope of the present invention. Rather, the present invention is directed to a methods for managing MEA hydration cycling fatigue life in fuel cells. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864 and the accompanying text present a detailed illustration of the components of one type of fuel cell stack and this particular subject matter is expressly incorporated herein by reference.

BRIEF SUMMARY OF THE INVENTION

The durability of a fuel cell utilizing a hydrated MEA strongly depends on the hydration status of the polymer electrolyte membrane used in the MEA. To reduce the resistance of proton conductivity in the membrane, it is normally desired to keep the polymer electrolyte membrane sufficiently hydrated. However, the present inventors have recognized that under typical operating conditions the MEA cycles through relatively wet and relatively dry states. These membrane hydration cycles are particularly prevalent during fuel cell start-up and shut-down operations and as power demand fluctuates during operation of the fuel cell.

One of the consequences of the aforementioned hydration cycling is significant degradation of the mechanical durability of the MEA. More specifically, the fatigue cycle life of a MEA is directly related to membrane stress. In turn, membrane stress is a strong function of water content, dehydration rate, temperature, and heating/cooling rate. The relationship between membrane stress and fatigue life can be represented using a fatigue life curve, which is also referred to herein as an S-N curve. According to the S-N curve, an example of which is illustrated in FIG. 1, where normalized calculated stress is plotted versus membrane life for a variety of different test conditions and where membrane life is defined as the number of cycles to leak initiation, higher membrane stresses generally correspond to lower fuel cell durability.

The present inventor has recognized that membrane stress can be minimized by properly controlling variables like membrane dehydration rate, water content, temperature, and heating/cooling rate. By minimizing membrane stress, the membrane fatigue life can be prolonged. According to one aspect of the present invention, a fatigue life contour map is created based on a suitable S-N curve and a suitable membrane stress model or some other suitable means for calculating membrane stresses for a given dehydration rate, water content, temperature, and starting water content when dehydration takes place. It is contemplated that suitable S-N curves should correspond closely to the membrane at issue and may be determined experimentally or approximated based on available membrane data.

An example of a suitable membrane stress model follows:

$$\varepsilon_{ij}(\sigma, t, T, \lambda) = \frac{\delta_{ij}}{3} B \cdot s + \frac{3}{2} \int_0^t D(t - \xi) \dot{s}_{ij}(\xi) d\xi + \delta_{ij} \beta \cdot \Delta\lambda$$

where values for the membrane hydration $\lambda$, $\Delta\lambda$, the membrane temperature T, the coefficient of hygro expansion $\beta$, and the uniaxial creep compliance D are input from material tests and fuel cell system tests, and where $\lambda$, $\Delta\lambda$ represent the water content of the membrane in terms of the number of water molecules per acid site with an unit of $H_2O/H^+$, $\varepsilon_{ij}$ is a strain tensor, $\sigma$ represents stress, t represents time, $\delta_{ij}$ is the Kronecker delta, B is the bulk creep compliance, s is the dilatational component of the applied stress, $s_{ij}$ is the deviatoric component of the applied stress, and $\xi$ is an integration variable representing time. The particulars of this membrane stress model are beyond the scope of the present invention and can be gleaned from a variety of suitable teachings on stress modeling. The model is presented here merely for illustrative purposes and should not be used to limit the scope of the present invention.

A fatigue life contour map, an example of which is illustrated in FIG. 2, can be constructed using the S-N life curve and a calculated, measured, approximated or otherwise determined membrane stress. Once the contour map is created, one can then determine the best path for dehydrating the membrane to a predetermined, preferred, or other suitable water content value by selecting a path that satisfies predetermined fatigue life conditions, as defined by the contour ranges of the contour map. Optimal dehydration paths are typically those that are characterized by a relatively high fatigue life. It is further noted that a series of fatigue life contour maps at various temperatures can be created. In this manner, one can transition at a certain water content point from one temperature to another by transferring from a contour map at one temperature to a contour map established for another temperature. One can then follow an optimal dehydration path using the contour map for the new temperature.

It is contemplated that the membrane can be dehydrated in any suitable manner. For example, and not by way of limitation, it is contemplated the membrane can be dehydrated by controlling the temperature of the membrane, the humidity in the cathode and anode flowfields, the flow rates and gas pressures in the respective cathode and anode flowfields.

In accordance with one embodiment of the present invention, a method of operating an electrochemical conversion cell is provided wherein the method comprises the steps of (i) initiating a membrane dehydration sequence when the membrane is characterized by an initial membrane hydration $\lambda_{WET}$ and (ii) maintaining the membrane dehydration sequence until the membrane is characterized by a target membrane hydration $\lambda_{DRY}$. According to the method, the membrane dehydration sequence is characterized by a drying rate that varies in a manner that substantially corresponds to a fatigue life contour map of the membrane.

In accordance with another embodiment of the present invention, the membrane dehydration sequence is characterized by a drying rate that does not necessarily follow a predetermined contour map but merely decreases as the membrane hydration approaches the target membrane hydration $\lambda_{DRY}$.

In accordance with another embodiment of the present invention, a system comprising at least one electrochemical conversion cell and a cell controller is provided. The cell controller is configured to initiate the membrane dehydration sequence when the membrane is characterized by an initial membrane hydration $\lambda_{WET}$ and to maintain the membrane dehydration sequence until the membrane is characterized by a target membrane hydration $\lambda_{DRY}$.

Accordingly, it is an object of the present invention to enhance the durability of a fuel cell utilizing a hydrated MEA. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 2:
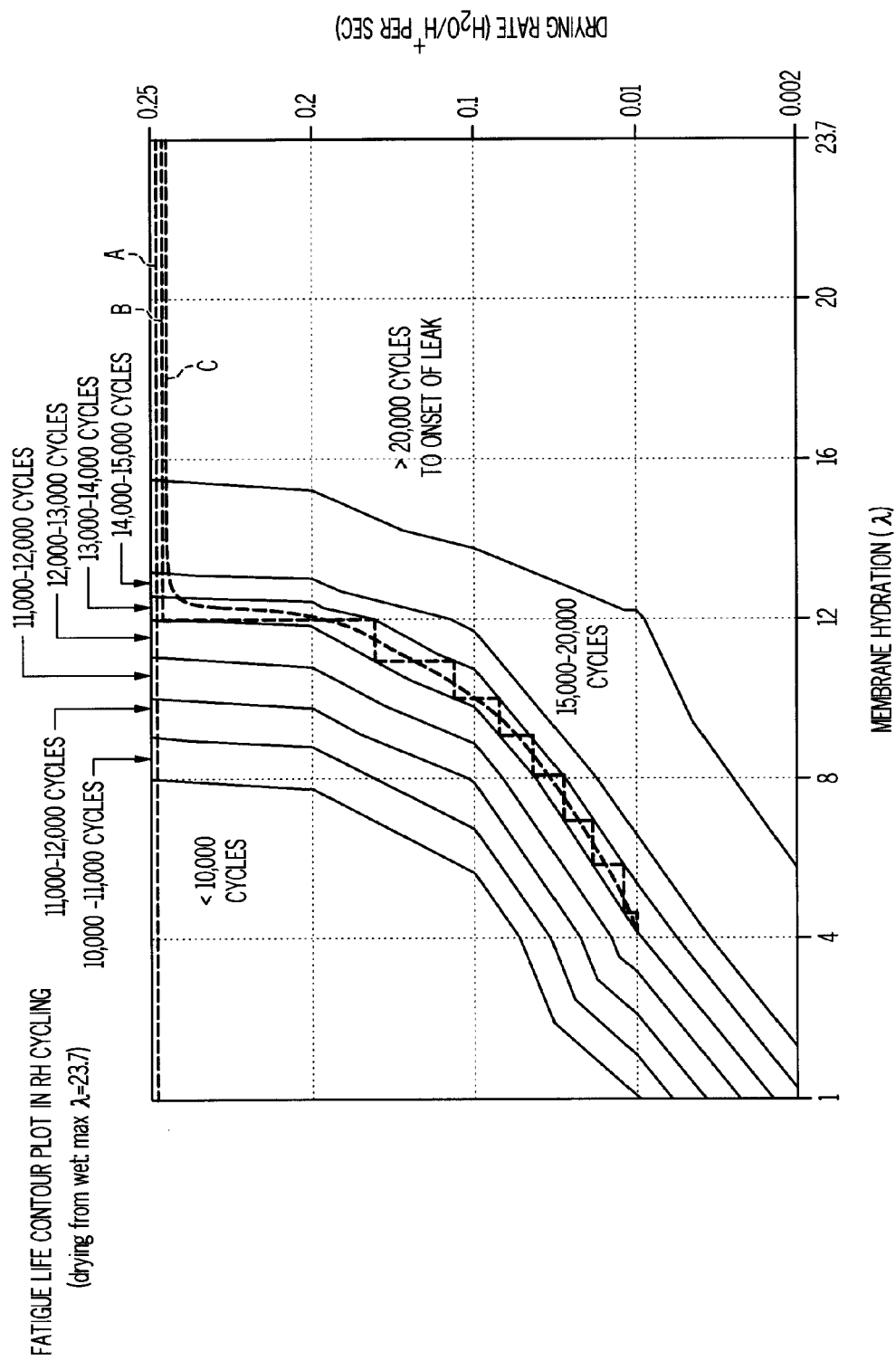
FIG. 2 is an illustration of a fatigue life contour map according to the present invention.
Figure 3:
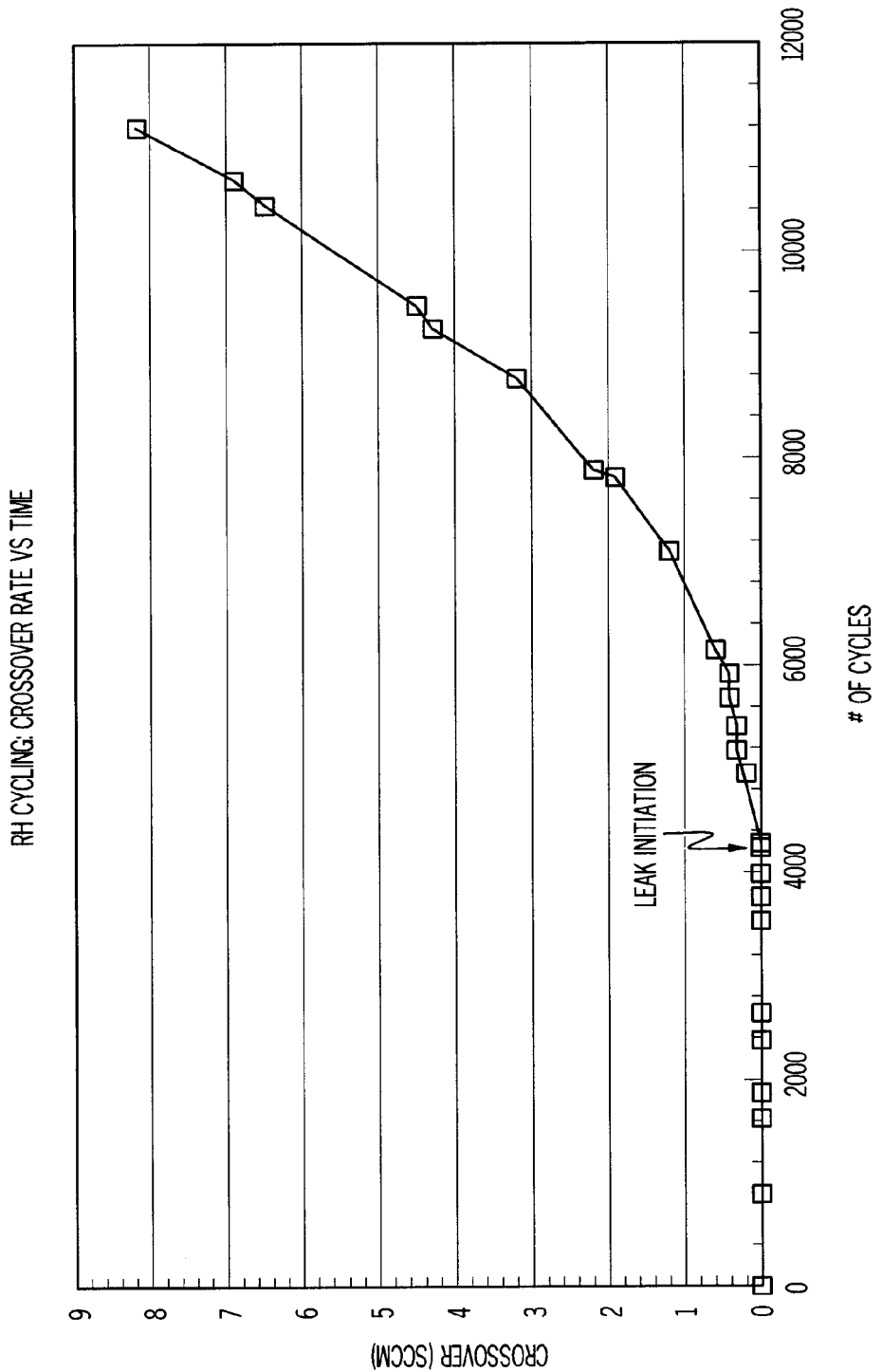
FIG. 3 is a graphical illustration of reactant leak rate across a proton exchange membrane in an electrochemical conversion cell.

The details of the present invention can be illustrated in further detail by referring to the particular fatigue life contour map illustrated in FIG. 2 and taking, as an example, a particular application that requires the need to decrease the water content of the proton exchange membrane from a relatively wet condition, $\lambda=23.7$, to a dryer condition of $\lambda=4$, at a temperature of about 80° C. For comparative purposes, the fatigue life cycle for dehydration along path A at a substantially constant rate of about 0.25 $H_2O/H^+$ per second would result in a fatigue life of about 6000-7000 cycles. According to the methodology of the present invention, referring to dehydration along path B, the membrane is initially dehydrated at a rate of about $H_2O/H^+$ per second until the membrane hydration $\lambda$ reaches a value where the expected fatigue life would fall below an acceptable level, e.g., <13,000 cycles to leak initiation. To stay within an optimal or acceptable fatigue life cycle value, the dehydration rate is intermittently or continuously reduced while keeping the dehydration path within the acceptable fatigue life cycle range, e.g., >13000, until the targeted water content $\lambda=4$ is reached. In this embodiment of the present invention, the expected fatigue life cycle would likely fall between 13000 and 14000 cycles, a significant improvement over the above-noted fatigue life of about 6000-7000 cycles. The dehydration rate is illustrated in a stepped nature in FIG. 2 to simplify the discussion of the present invention. However, it is noted that a less intermittent reduction of the dehydration rate within the specific contour path illustrated in FIG. 2 is likely to result in further improvements in expected fatigue life.

Accordingly, the methodology of the present invention calls for the initiation of a membrane dehydration sequence at an initial membrane hydration $\lambda_{WET}$ and maintenance of the dehydration sequence until the membrane is characterized by a target membrane hydration $\lambda_{DRY}$. It is contemplated that the dehydration sequence of the present invention need not be initiated when the membrane hydration is at a maximum value or terminated when the membrane hydration is at a minimum value. Rather, the sequence may be initiated at any point in the life cycle of the membrane where controlled membrane dehydration is desirable and terminated at any point where controlled membrane dehydration is no longer required or desired. In any event, the initial membrane hydration $\lambda_{WET}$ is substantially larger than the target membrane hydration $\lambda_{DRY}$. Generally, target membrane hydrations $\lambda_{DRY}$ are often below about $\lambda=8$, where $\lambda$ represents the water content of the membrane in terms of the number of water molecules per acid site. It is contemplated that initial and target membrane hydrations will vary significantly depending upon the particular context in which the present invention is to be employed.

It is contemplated that the membrane can be dehydrated in any suitable manner, including, but not limited to, dehydration through control of the temperature of the membrane, the humidity in the first reactant flowfield, the humidity in the second reactant flowfield, the flow rate in the first reactant flowfield, the flow rate in the second reactant flowfield, the gas pressure in the first reactant flowfield, and/or the gas pressure in the second reactant flowfield.

Figure 1:
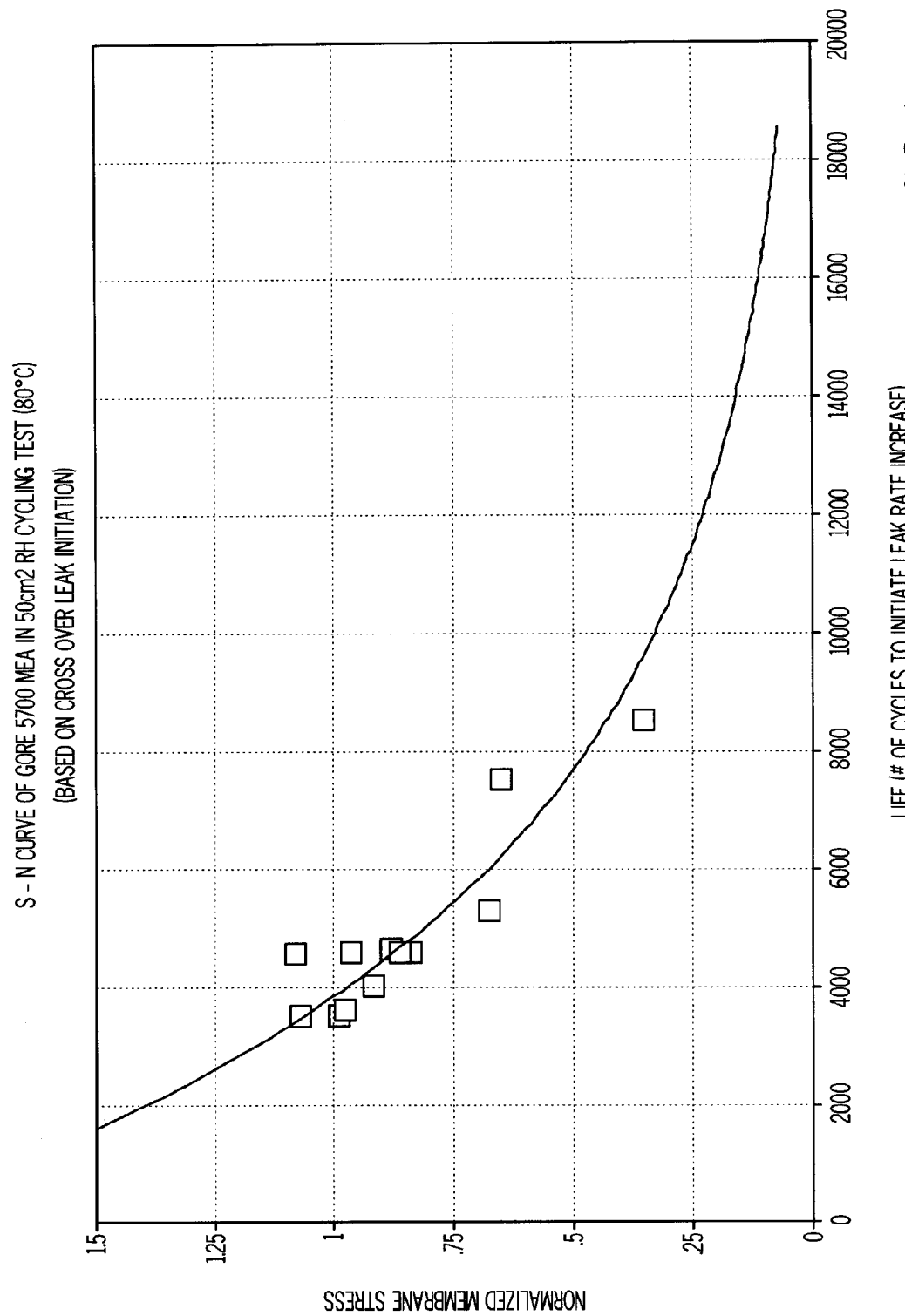
FIG. 1 is an illustration of a fatigue life curve, also referred to herein as an S-N curve, showing the relationship between membrane stress and fatigue life.

The dehydration sequence is characterized by a drying rate that varies in a manner that substantially corresponds to a fatigue life contour map of the membrane, an example of which is illustrated in FIG. 2, discussed above. More specifically, a fatigue life contour map of the membrane can be constructed using a fatigue life curve of the membrane and a calculated, measured, approximated or otherwise determined membrane stress. The fatigue life curve used to construct the map, an example of which is illustrated in FIG. 1 discussed above, typically comprises a plot representative of points at which a substantial increase in the leak rate of reactants across the membrane is initiated. It is noted, however, that a variety of alternative means may be utilized to measure fatigue life. For example, instead of referring to the point at which there is a substantial increase in the leak rate across the membrane, one could refer to the point at which the leak rate exceeds a given value, such as 0.2 sccm/cm² of MEA active area. In any event, the fatigue life curve illustrated in FIG. 1 was created by monitoring leak initiation for a membrane of interest over a variety of operating conditions and plotting various points of leak initiation as a function of a calculated or otherwise determined membrane stress and the number of hydration cycles prior to leak initiation. The membrane stress used to create the fatigue life contour map can be determined in a variety of ways. For example, the membrane stress can be determined by using the above-described membrane stress model to represent the particular membrane and operating conditions of interest.

Regardless of how fatigue life contour maps according to the present invention are created, the dehydration rate is controlled such that it tracks particular contours within the fatigue life contour map. For example, the dehydration sequence can be controlled such that it tracks only those contours within the map that are characterized by an expected cycle life value that exceeds about 6,000 cycles. In the embodiment of the present invention illustrated in FIG. 2, referring to dehydration path B presented in the graph, the dehydration sequence is controlled such that it tracks only those contours within the map that are characterized by a life cycle of above about 13,000 cycles. In general, the dehydration sequence of path B is characterized by a drying rate that decreases as membrane hydration approaches the target membrane hydration $\lambda_{DRY}$. The drying rate is illustrated in FIG. 2 as decreasing in a substantially intermittent manner but it is noted that the drying rate can decrease continuously (see path C), intermittently, or continuously and intermittently, in a uniform or non-uniform manner. Further, as is illustrated in FIG. 2, dehydration sequences according to the present invention may include periods of substantially constant, non-decreasing drying rate.

Referring further to FIG. 2 and comparing relatively constant dehydration path A with path B, described above, it is noted that the dehydration sequence represented in path B is characterized by an expected life cycle that greatly exceeds the expected cycle life associated with the substantially constant dehydration rate of path A, which is above about 0.125. Of course, the substantially constant dehydration rate of 0.125 is presented here for illustrative purposes only and should not be taken to limit the scope of the invention beyond that which is defined in the appended claims. For illustrative purposes, it is noted that a life cycle life value may be selected such that it represents a point at which a substantial increase in the leak rate of reactants across the membrane is initiated. A cycle represents humidification cycling of the membrane from a relatively hydrated state, to a relatively dehydrated state, and back to the relatively hydrated state.

According to one embodiment of the present invention, it is contemplated that effective dehydration sequences may also be configured without reference to a fatigue life contour map by merely controlling the dehydration sequence such that the drying rate decreases gradually or intermittently as the membrane hydration approaches the target membrane hydration $\lambda_{DRY}$.

According to another embodiment of the present invention, the electrochemical conversion cell is provided with a cell controller that is programmed to initiate and maintain the membrane dehydration sequence until the membrane is characterized by a target membrane hydration $\lambda_{DRY}$. In this light, it is noted that the membrane dehydration sequence can be initiated upon detection of a trigger signal that represents of a particular operating condition of the electrochemical conversion cell. For example, it is contemplated that the trigger signal can represent the water content of the membrane such that dehydration is initiated when the water content reaches a maximum value or exceeds a predetermined threshold value. Alternatively, the trigger signal may represent the relative humidity in the reactant flowfield, the present power demand on the cell, the initiation or termination of a shut-down or start-up sequence in the cell, the completion of a hydration cycle of the cell, or combinations thereof.

In addition, it is contemplated that the dehydration sequence can be terminated upon detection of a termination signal representative of an operating condition of the electrochemical conversion cell. The termination signal can represent the water content of the membrane, the relative humidity in the reactant flowfield, power demand on the cell, the initiation or termination of a shut-down or start-up sequence in the cell, the completion of a dehydration cycle of the cell, or combinations thereof.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating an electrochemical conversion cell comprising a membrane electrode assembly positioned between first and second reactant flowfields, wherein said membrane electrode assembly comprises a proton exchange membrane and said method comprises:

initiating a membrane dehydration sequence when said membrane is characterized by an initial membrane hydration $\lambda_{WET}$; and maintaining said membrane dehydration sequence until said membrane is characterized by a target membrane hydration $\lambda_{DRY}$, wherein said initial membrane hydration $\lambda_{WET}$ is substantially larger than said target membrane hydration $\lambda_{DRY}$, and said membrane dehydration sequence is characterized by a drying rate that varies in a manner which substantially corresponds to a fatigue life contour map of said membrane, wherein said dehydration sequence is characterized by a drying rate that decreases as membrane hydration approaches said target membrane hydration $\lambda_{DRY}$.

2. A method of operating an electrochemical conversion cell as claimed in claim 1 wherein said membrane is dehydrated by controlling one or more of the temperature of the membrane, the humidity in the first reactant flowfield, the humidity in the second reactant flowfield, the flow rate in the first reactant flowfield, the flow rate in the second reactant flowfield, the gas pressure in the first reactant flowfield, and the gas pressure in the second reactant flowfield.

3. A method of operating an electrochemical conversion cell as claimed in claim 1 wherein said dehydration rate varies such that it tracks portions of said fatigue life contour map that are characterized by an expected cycle life value that exceeds an expected cycle life associated with substantially constant dehydration at a rate substantially greater than a majority of those tracked in said fatigue life contour map.

4. A method of operating an electrochemical conversion cell as claimed in claim 1 wherein said drying rate varies such that it tracks portions of said fatigue life contour map that are characterized by an expected cycle life value that exceeds about 6,000 cycles, where said cycle life value represents a point at which a substantial increase in the leak rate of reactants across said membrane is initiated, and a cycle represents humidification cycling of said membrane from a relatively hydrated state, to a relatively dehydrated state, and back to said relatively hydrated state.

5. A method of operating an electrochemical conversion cell as claimed in claim 1 wherein said drying rate decreases continuously, intermittently, or continuously and intermittently, in a uniform or non-uniform manner.

6. A method of operating an electrochemical conversion cell as claimed in claim 1 wherein said target membrane hydration $\lambda_{DRY}$ is below about $\lambda=8$, where $\lambda$ represents the water content of said membrane in terms of the number of water molecules per acid site.

7. A method of operating an electrochemical conversion cell as claimed in claim 1 wherein said fatigue life contour map of said membrane is constructed using a fatigue life curve of said membrane and a calculated, measured, approximated or otherwise determined membrane stress.

8. A method of operating an electrochemical conversion cell as claimed in claim 7 wherein said fatigue life curve comprises a plot representative of points at which a substantial increase in the leak rate of reactants across said membrane is initiated.

9. A method of operating an electrochemical conversion cell as claimed in claim 8 wherein said points are a function of stress in said membrane.

10. A method of operating an electrochemical conversion cell as claimed in claim 8 wherein said membrane stress is determined from a stress model representative of said membrane.

11. A method of operating an electrochemical conversion cell as claimed in claim 1 wherein said membrane dehydration sequence is initiated upon detection of a trigger signal representative of an operating condition of said electrochemical conversion cell.

12. A method of operating an electrochemical conversion cell as claimed in claim 11 wherein said trigger signal is representative of the water content of said membrane, the relative humidity in the reactant flowfield, the power demand on said cell, the initiation or termination of a shut-down or start-up sequence in said cell, the completion of a hydration cycle of said cell, or combinations thereof.

13. A method of operating an electrochemical conversion cell as claimed in claim 11 wherein said trigger signal represents a point at which the water content of said membrane reaches a maximum value.

14. A method of operating an electrochemical conversion cell as claimed in claim 11 wherein said trigger signal is representative of a water content of said membrane exceeding about 12 water molecules per acid site.

15. A method of operating an electrochemical conversion cell as claimed in claim 1 wherein said membrane dehydration sequence is terminated upon detection of a termination signal representative of an operating condition of said electrochemical conversion cell.

16. A method of operating an electrochemical conversion cell as claimed in claim 15 wherein said termination signal is representative of the water content of said membrane, the relative humidity in the reactant flowfield, the power demand on said cell, the initiation or termination of a shut-down or start-up sequence in said cell, the completion of a dehydration cycle of said cell, or combinations thereof.

17. A method of operating an electrochemical conversion cell as claimed in claim 15 wherein said termination signal is representative of a water content of said membrane below about 12 water molecules per acid site.

18. A system comprising at least one electrochemical conversion cell and a cell controller, wherein:
said electrochemical conversion cell comprises a membrane electrode assembly positioned between first and second reactant flowfields;
said membrane electrode assembly comprises a proton exchange membrane; and
said cell controller is configured to initiate a membrane dehydration sequence when said membrane is characterized by an initial membrane hydration $\lambda_{WET}$, and maintain said membrane dehydration sequence until said membrane is characterized by a target membrane hydration $\lambda_{DRY}$, wherein said initial membrane hydration $\lambda_{WET}$ is substantially larger than said target membrane hydration $\lambda_{DRY}$ and said membrane dehydration sequence is characterized by a drying rate that varies in a manner which substantially corresponds to a fatigue life contour map of said membrane, wherein said dehydration sequence is characterized by a drying rate that decreases as membrane hydration approaches said target membrane hydration $\lambda_{DRY}$.

* * * * *